United States Patent [19]

Nespor

[11] Patent Number: 4,650,961

[45] Date of Patent: Mar. 17, 1987

[54] BATTERY POWERED THERMAL WIRE STRIPPER

[76] Inventor: Tony Nespor, 2515 Glencoe Rd., Baltimore, Md. 21234

[21] Appl. No.: 725,809

[22] Filed: Apr. 22, 1985

Related U.S. Application Data

[63] Continuation-in-part of Ser. No. 624,641, Jun. 25, 1984, Pat. No. 4,558,613.

[51] Int. Cl.$^4$ .................... H02G 1/12; H05B 1/00; H05B 3/00
[52] U.S. Cl. ...................................... 219/233; 30/140; 81/9.4; 83/171; 219/221; 219/240
[58] Field of Search ............... 219/230, 221, 227, 229, 219/233, 234, 240; 30/140; 81/9.4, 9.5, 9.51; 83/170, 171

[56] References Cited

U.S. PATENT DOCUMENTS

| | | |
|---|---|---|
| 1,632,320 | 6/1927 | Sippel et al. |
| 2,192,056 | 2/1940 | Watts . |
| 2,415,669 | 2/1947 | Beuschel . |
| 2,564,126 | 8/1951 | Neece ............................... 219/233 X |
| 3,038,985 | 6/1962 | Sisk .................................. 219/233 X |
| 3,041,439 | 6/1962 | Sisk .................................. 219/221 X |
| 3,107,287 | 10/1963 | Schlechter ........................ 30/140 X |
| 3,237,489 | 3/1966 | Trethewey et al. ............. 219/233 X |
| 3,408,478 | 10/1968 | Penn ................................ 219/233 X |
| 3,772,127 | 11/1973 | James .............................. 219/233 X |
| 4,558,613 | 12/1985 | Nespor ............................ 219/221 X |

Primary Examiner—Anthony Bartis
Attorney, Agent, or Firm—John F. McClellan, Sr.

[57] ABSTRACT

A wirestripper for thermal stripping a length of insulated wire includes a "V"-shaped flat metal strip of nickel chrome alloy 0.2 mm thick and having first and second arms 1 mm wide and 3.2 cm long extending from a vertex. The "V"-shaped strip is supported between a support post at the vertex and a respective electrode post at the end of each of the arms, with the electrode posts and support post being parallel and biased apart to tension the "V"-shaped strip. The electrode posts are spaced apart a sufficient distance to permit the length of wire to be stripped to be passed laterally therebetween and between the first and second arms into the vertex for stripping. The serial resistance of the "V"-shaped strip between the electrode posts sufficient for energization of the strip by a 1.2 volt battery connected to the electrode posts.

5 Claims, 4 Drawing Figures

BATTERY POWERED THERMAL WIRE STRIPPER

This application is a continuation-in-part of my co-pending application Ser. No. 624,241 filed 6-25-84 for THERMAL WIRE STRIPPER now U.S. Pat. No. 4,558,613, issued 12-17-85.

This invention relates generally to stripping of thermoplastic insulation from wires and particularly to a system employing direct current from a battery for such stripping.

BACKGROUND OF THE INVENTION

In the art concerning thermal wire stripping, the following U.S. Patents are known: U.S. Pat. No. 2,415,669 to C. B. Beuschel, 2-11-47, disclosed an electrode with a "V"-shaped opening for cutting through insulation on an end portion of a wire, and provision for passing a heavy current through the end portion of the wire to release the insulation on it for stripping, all in table-mounted apparatus.

U.S. Pat. No. 2,192,056 to G. V. Watts, 2-27-40, disclosed an alternating current powered table-mount stripper with interlocked "V" shaped wires and means to move them relative to each other.

U.S. Pat. No. 1,632,320 to E. H. Sippel and Norman J. Wright, 6-14-27, disclosed a table-mount wire stripper with a hot strip against which insulated wire is held and rotated in preparation for stripping.

However, as will be seen, these prior art strippers fail to provide the convenience, efficiency, economy and self-tensioning operation of my inventions, both as disclosed in the application, cross-referenced above (Ser. No. 621,241, incorporated and made a part hereof) and as improved in a particular direction by the present invention.

STRIPPER OF CO-PENDING APPLICATION

The disclosure of my above cross-referenced application includes a stripper in the form of a strip of "Nichrome" or the like held by a box between first and second biased-apart electrodes protruding from the box. The strip of "Nichrome" has a tear-drop-shape opening in it through which an end of an insulated wire is thrust and then is drawn to the small end of the tear drop shape, rotated, and pulled free. The insulation removed drops free at the small end of the strip. In the embodiment for stripping the small gauges of wire, the strip necessarily is thin, about 0.007 inch (0.2 mm) thickness, and is about 1¼ in. (3.3 cm) long between centers of the electrodes, about ¼ in. (0.6 cm) at the widest. At the throat it is about 3/32 inch (0.2 cm) wide and at the margins of the slot about half that.

The biasing apart of the electrodes keeps the thin strip of "Nichrome" tensioned, regardless of thermal expansion, preventing damage from buckling or sagging.

A low-voltage high-current transformer supplies the power for heating the strip, voltage preferably being about 0.4 volts and current being about 6 amperes. Primary voltage may conveniently be 110 volts.

SUMMARY OF THE PRESENT INVENTION

However, if it is desired to use battery power instead, it can be seen that no conventional battery will substitute for the transformer in this application. For the resistance of 0.06 ohms more or less, a battery of 0.4 volt would be required, and such not being commonly available, the less so with the desirable feature of rechargeability, it was conceived that a solution might lie in changing the resistance of the "Nichrome" strip, if practicable.

Because the length of the thin strip from end to end is in good part determined by requirements of stiffness and strength and durability and to a lesser extent by manufacturing interchangeability considerations relative to the invention described in my cross-referenced application, the following invention was made.

No 0.4 volt battery being available to replace the commonly available rechargeable 1.2 v "NICAD" battery desired to be used, increasing the resistance was decided on to prevent overheating. Approximately doubling the length would do this. The teardrop cut-out was therefore extended through the large end to separate the strip into a "V" shape with a resistance across the top of the "V"-shape, between the ends of the equal arms, of 0.36 ohms.

The second electrode, the electrode at the apex of the "V"-shape, was substituted by a similar support not electrically connected. The first and second electrodes were moved to the ends of the equal arms of the "V" shape and respectively connected to terminals of the battery.

Additional advantages provided by this new invention include freedom of the user to pass wire to be stripped laterally between the arms of the "V"-shape and to continue to the vertex with one stripping motion, rather than poking an end of it into the closed end of the teardrop shape and then moving it to the vertex.

Therefore, objects of the invention are to provide a wire-stipper for thermal stripping by passage of an end portion of a wire to be stripped laterally between the arms and into the vertex of a "V"-shaped heated strip from which it pulled, stripped. To permit the use of battery power for the heating, the heated strip is tensioned between a support at the vertex and a respective electrode at the end of each of the arms, so that the serial resistance of the "V"-shape is sufficient for use with a 1.2 volt battery.

The above and other objects and advantages of this invention will become more readily apparent on examination of the following description, including the drawings in which like reference numerals refer to like parts.

DETAILED DESCRIPTION

Figure 1:
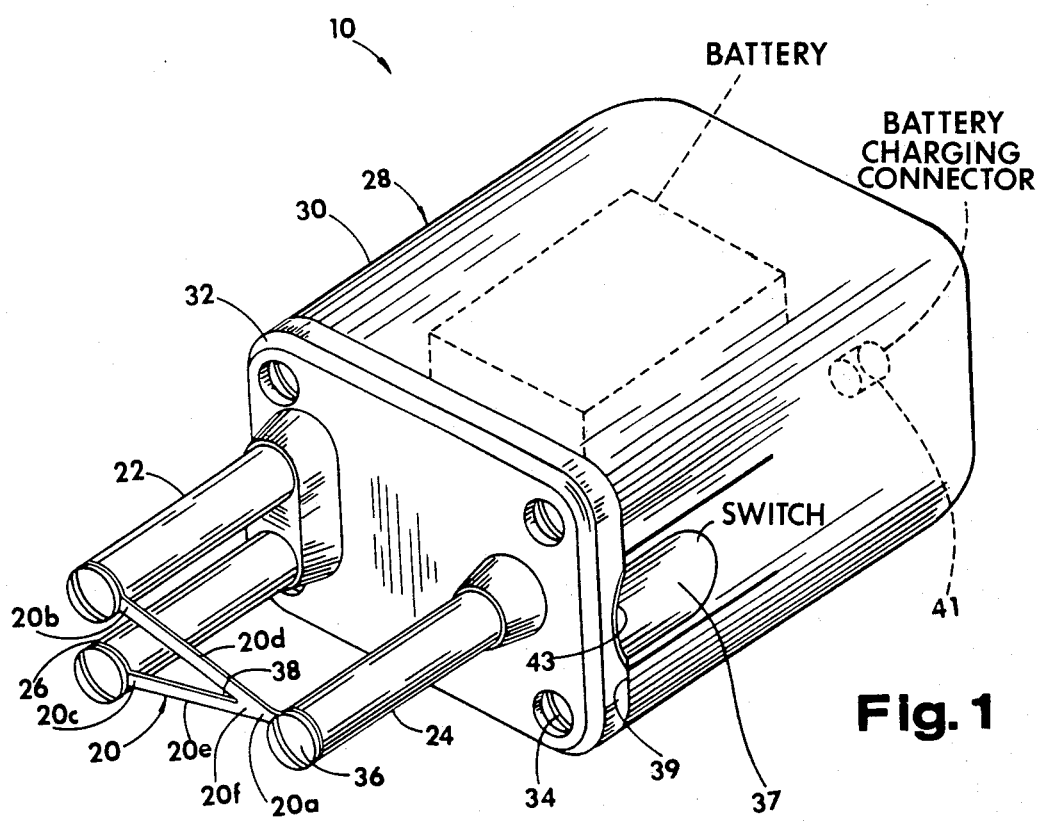
FIG. 1 is a perspective view of the invention.

Fig. 1 shows preferred embodiment 10 of the invention. To receive a length of thermoplastic insulated wire for stripping, the invention provides a unitary "V"-shaped metal strip 20 of "Nichrome" nickel-chrome alloy or other suitable material such as "Evanohm" for resistance heating when a current is passed through it.

Supporting the strip 20 are three posts 22, 24, 26 extending parallel to each other from a frame 28, that may be a box 30 with cover 32 retained by screws 34. As will be seen, post 24 is not electrically connected to the system, but is instead merely a support at the vertex 20a of the strip 20. The other two posts 22, 26 are first and second electrodes, respectively connected to terminals of a 1.2 volt battery cell, or battery of cells in parallel, and also serve as supports for the ends 20b, 20c of the arms 20d, 20e of the "V"-shape.

Screws 36 retain the respective ends of the strip to the ends of the posts.

A switch 37 is provided to control current flow through the "V"-shaped metal strip 20, in conventional manner, being hooked in series with it and the battery, not shown. A coaxial connector for recharging the battery may be provided as at 41.

In operation, wire to be stripped of thermoplastic insulation by the combined mechanical and thermal action of the invention may be passed in one motion laterally between the electrodes 22, 26 which may be spaced to serve as a gauge preventing attempts to strip oversize wire, and into the throat 38. The throat is near the vertex, where the conjunction of the arms of the hot strip melts the insulation at the sides, and in a continuation of the motion, with or without twirling, the wire may be pulled from the throat, free of insulation. The throat preferably is adjacent a sturdy portion 20f at the junction of the arms, that is broader than either arm. For a purpose to be explained, the end face of the case member at 39 and the end face 43 of the member 32 are, in the relaxed position, of slightly different contour.

Figure 2:
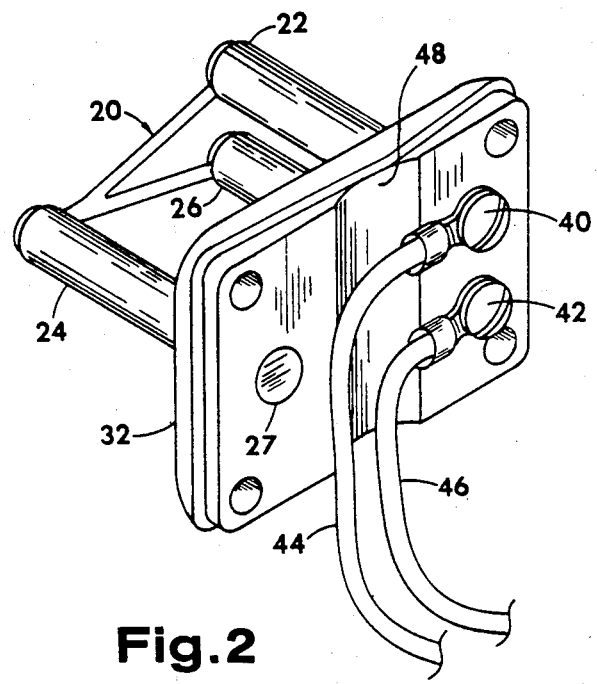
FIG. 2 is a perspective view of a rear portion of the cover plate and connections, shown in FIG. 1.

FIG. 2 shows in rear perspective view that the posts 22, 24, 26 that hold the strip 20 may be, as at 27, force-fitted in a hole or otherwise fixed in the cover 32 from the front of which they extend perpendicularly but substantially parallel with each other. Post 24 is free of electrical connection but posts 22 and 26, the electrodes, have respective screws 40, 42 or other suitable means electrically connecting them with the power leads 44, 46 from the battery, not shown.

Means for tensioning and maintaining tension on the heated strip by biasing the posts 22, 26 away from the post 24, follow a somewhat similar disclosure in my aforementioned co-pending U.S. patent application. The cover 32 may have a reduced-thickness central portion 48 and it, as shown here, may be slightly convex on the rearward face transverse to the central portion 48. When tightened on the end of the box by the screws, as described in reference to the first figure, the cover bends the posts to tension the heated strip 20. To prevent unwanted stresses in the heated strip, the centerline of the heated strip is centered perpendicular to the cover 32, resulting in application of a symmetrical end-to-end force on the heated "V"-shaped metal strip.

Figure 3:
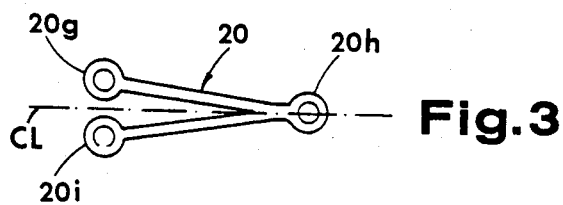
FIG. 3 is a plan view of the "V"-shape heated strip of the invention with a showing of the electrical connections.

FIG. 3 shows symmetry about the centerline C-L of the "V"-shaped metal strip 20, in plan view. At each end of the arms and at the vertex, a respective loop 20g, 20h, 20i provides for screw engagement to hold it.

In the embodiment for stripping the small gauges of wire from about No. 30 to No. 14 gauge single strand as an example, the "V"-shaped "Nichrome" strip preferably is about 0.008 inch (0.2 mm) thick. Each arm of the "V"-shape is about 0.05 inch (1 mm) wide and 1¼ in. (3.2 cm) long. Center distance between posts is 1¼ and ⅜ inches (3.2 by 0.9 cm) and overall length of the strip is about 1¼ inch (3.3 cm). The posts may be about 1 inch (2.5 cm) long on the exterior of the case. Operating strip-temperature may be about 480° F. (220° C.). Time to come to stripping temperature is about 1 to 2 seconds. Material for the box and cover may be ABS or other suitable resilient thermoplastic of the proportions illustrated. Larger sizes may be made in proportion.

Figure 4:
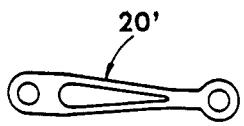
FIG. 4 is a plan view of an old art shape of the strip with teardrop opening, in my cross-referenced application.

FIG. 4 shows in similar view and to the same scale the strip 20' disclosed in my cross-referenced application for U.S. patent, useful for being powered by alternating current but having insufficient resistance for direct-current use at a 1.2 volt potential.

The invention strips round, oblong and the other cross-section shape wire, single strand and cable, and shielded cable, with ease. Further, it is extremely safe; the thermal mass is so low that the strip can be rubbed with bare fingers without burning them, and the wire stripped is never heated. The strip never deteriorates or gets dull.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for thermal stripping of a length of insulated wire, comprising: a "V"-shaped flat metal strip with a vertex and first and second arms with a respective end on each arm; means for tensioning said "V"-shaped flat metal strip and means for heating said "V"-shaped flat metal strip by electrical connection with a battery cell, the means for tensioning including: a frame, means extending from the frame for fixedly supporting at the vertex the "V"-shaped flat metal strip free of electrical connection, first and second electrodes extending from the frame and respectively supporting the first and second arms at said ends thereof and means for biasing apart the means for supporting and the first and second electrodes; the means for heating including means on the first and second electrodes for said electrical connection to a battery cell and passing current serially through said "V"-shaped flat metal strip between said first and second electrodes, and the first and second electrodes being spaced apart a distance permitting a said length of insulated wire to be passed laterally therebetween and between the first and second arms of the "V"-shaped flat metal strip into the vertex for stripping by being pulled from said vertex.

2. A system as recited in claim 1, said means for biasing including means for distorting a portion of said frame symmetrically relative to another portion of said frame and to said "V"-shaped flat metal strip.

3. A system as recited in claim 2, the means for tensioning further including a respective loop at the vertex and at each of said first and second ends, and all said means for supporting and first and second electrodes having a portion engaging a respective said loop.

4. A system as recited in claim 1, the means extending from the frame for fixedly supporting at the vertex the "V"-shaped flat metal strip, and the first and second electrodes, each comprising a post, and all said posts being substantially parallel.

5. A system as recited in claim 1, said system having characteristics adapting it for use with a said battery cell of 1.2 volts including in an embodiment for stripping small gauges of wire from about No. 30 to No. 14 the "V"-shaped flat metal strip being of "Nichrome" nickel chrome alloy substantially 0.2 mm thick, and each of the first and second arms being substantially 1 mm wide and substantially 3.2 cm long.

* * * * *